United States Patent [19]

Payr

[11] Patent Number: 5,179,883
[45] Date of Patent: Jan. 19, 1993

[54] APPARATUS FOR DIVIDING WOOD

[76] Inventor: Hans Payr, Graben 1, A-9560 Feldkirchen-Poitschach, Austria

[21] Appl. No.: 737,810
[22] Filed: Jul. 29, 1991

[30] Foreign Application Priority Data

Jul. 30, 1990 [AT] Austria .................................. 1596/90

[51] Int. Cl.⁵ .......................... B26D 7/06; B27B 5/06; B27B 5/18
[52] U.S. Cl. ..................................... 83/155.1; 83/206; 83/277; 83/405; 83/488; 83/507; 83/578; 144/376; 269/56
[58] Field of Search ................. 83/485, 483, 488, 578, 83/155.1, 277, 206, 507; 144/376, 378; 269/56, 242, 13, 58, 71

[56] References Cited

U.S. PATENT DOCUMENTS

| 2,693,056 | 11/1954 | Gagne | 51/80 |
|---|---|---|---|
| 3,088,501 | 5/1963 | Good et al. | 83/726 |
| 3,777,457 | 7/1973 | Thompson | 83/471.2 |
| 3,797,349 | 5/1974 | Smith | 83/435 X |
| 3,815,570 | 6/1974 | Story | 125/14 |
| 4,104,944 | 8/1978 | Janssen | 83/291 X |
| 4,148,341 | 4/1979 | Critchell et al. | 83/471.2 X |
| 4,196,648 | 4/1980 | Jones et al. | 83/365 |
| 4,262,572 | 4/1981 | Flodin | 144/376 X |
| 4,348,924 | 9/1982 | Jenkner | 83/39 |
| 4,392,520 | 7/1983 | Wrightman | 83/435.1 X |
| 4,468,992 | 9/1984 | McGeehee | 83/56 |
| 4,515,196 | 5/1985 | Shields | 144/378 |
| 4,584,918 | 4/1986 | Stubbe et al. | 83/488 X |
| 4,941,382 | 7/1990 | Smith et al. | 83/713 |
| 5,014,583 | 5/1991 | Webb et al. | 83/437 X |

FOREIGN PATENT DOCUMENTS

| 0055793 | 4/1985 | European Pat. Off. . |
|---|---|---|
| 88130320 | 1/1989 | Fed. Rep. of Germany . |
| 583469 | 1/1925 | France . |

OTHER PUBLICATIONS

"Ein Sager als Erfinder", *Holz-Kurier*, No. 24, Jun. 14, 1990, pp. 12-14.

Primary Examiner—Frank T. Yost
Assistant Examiner—Kenneth E. Peterson
Attorney, Agent, or Firm—Young & Thompson

[57] ABSTRACT

An apparatus for finishing wood (cants) comprises a circular saw (6) which can be reciprocated (double arrow 7) in the cutting plane (11), and several clamping trestles (1) for holding the piece of wood to be divided, these trestles being adjustable perpendicularly to the cutting plane (11) in order to set the cutting position. Furthermore, supports (3) are provided for the wood, wherein the lower clamping jaws (2) of the clamping trestles (1) can be lowered underneath the supports (3). The saw (6) is designed for forward and rearward cutting so that, with each stroke of the saw, a cut can be executed. For feeding the pieces of wood to be divided, inclined conveyor belts (13) are provided which deposit the pieces of wood on lifting tables (12), the latter then placing such pieces onto the supports (3) for the wood.

14 Claims, 4 Drawing Sheets

APPARATUS FOR DIVIDING WOOD

FIELD OF THE INVENTION

The invention relates to an apparatus for dividing wood, particularly for finishing precut wood, with a device for holding the wood and with a saw displaceable in parallel to the longitudinal extension of the wood for executing the dividing work, wherein the device for holding the wood is adjustable transversely to the direction of movement of the saw in order to set the cutting position and exhibits clamping trestles with respectively two clamping jaws engaging the wood from above and from below.

BACKGROUND OF THE INVENTION

Such apparatuses are utilized predominantly for the finishing of precut wood (cants). The saws used for the finishing step can be circular saws or band saws and are fixedly mounted in conventional facilities. In known facilities, it is the device for holding the wood to be divided which is adjustable transversely to the longitudinal extension of the wood, i.e. crosswise to the direction of the cut, for aligning the wood with respect to the saw (setting of the cutting position), and is additionally movable in the direction of the wood for executing the sawing work. This dual mobility of the holding device not only presents structural disadvantages since the device for holding the wood must be movable in two directions, but also displays the drawback that the operator of the apparatus does not see the wooden blank at rest in front of him and therefore finds it hard to observe how the blank can be divided with a minimum of waste.

It has been known from EP-A 55,793 to retain wooden boards, during the edging of the same, in alignment in an apparatus, and to move the tool (saw or milling cutter) intended for the edging step with the board being at a standstill. For fixing the board in the apparatus, several pressure pistons are provided which can be advanced from above toward a table.

U.S. Pat. No. 4,348,924 discloses an apparatus for edging the rims of multiple-layer, panel-shaped workpieces; in these workpieces, the two outer layers project past the rim of the central layer. In order to retain the workpiece, a clamping means is provided which is equipped with two clamping jaws, the clamping jaws engaging respectively from above and from below at the workpiece and holding the latter. The clamping means for the workpiece can be adjusted with respect to the cutting plane of the saw with the aid of a motor in a manner not shown in detail. The saw is moved relatively to the stationary workpiece for the edging operation.

SUMMARY OF THE INVENTION

The invention is based on the object of providing an apparatus of the type discussed hereinabove which does not exhibit the aforedescribed disadvantages and which, in particular, is simple in its operation.

According to the invention, this object has been attained by providing that the saw, guided on a stationary guide means, is a saw that is effective toward two sides; that the device for holding the wood exhibits slideways for the clamping trestles and supports for the wood; and that the lower clamping jaws supported at the clamping trestles can be lowered through cutouts to below the supports.

The invention results in the advantage, on the one hand, that idle strokes are avoided because with each stroke, i.e. during the forward and backward reciprocation of the saw, a cutting operation (dividing work) and, respectively, a finishing operation can be performed.

The apparatus according to this invention for dividing wood is also advantageous insofar as it occupies little space. It is furthermore possible to feed wood laterally to the device for holding the wood so that an operator also enjoys a satisfactory overview of the working surface, i.e. the operating range.

In the apparatus according to this invention, the wood is at a standstill during execution of the cutting work, and the saw moves relatively to the blank to be divided. This not only simplifies the structure of the apparatus, but the required space for the apparatus in total is likewise reduced.

Advantageous further embodiments of the invention are set forth in the dependent claims.

BRIEF DESCRIPTION OF THE DRAWINGS

Additional details and features of the invention can be seen from the following description of preferred embodiments, reference being had to the appended drawings wherein.

DETAILED DESCRIPTION OF THE INVENTION

The apparatus serves for dividing wood, particularly for finishing precut wood. In case the apparatus according to the invention is utilized as a finishing saw, it is possible to manufacture window frames, thin sheets, slats, and so forth from precanted wood. It is likewise possible to produce unplaned boards (blanks intended for planing) by means of the apparatus of this invention. However, the apparatus can also be utilized as a saw for the edging of blocks.

The apparatus comprises a device for holding the wood to be divided, with several clamping trestles 1—three in the illustrated embodiment—each of which exhibits two clamping jaws 2. In the embodiment illustrated in FIGS. 1 and 2, the clamping jaws 2 can be displaced toward each other and away from each other by means of a drive mechanism, not shown in detail, for clamping the wood to be divided in place, this drive mechanism being accommodated in the clamping trestles 1.

Figure 1:
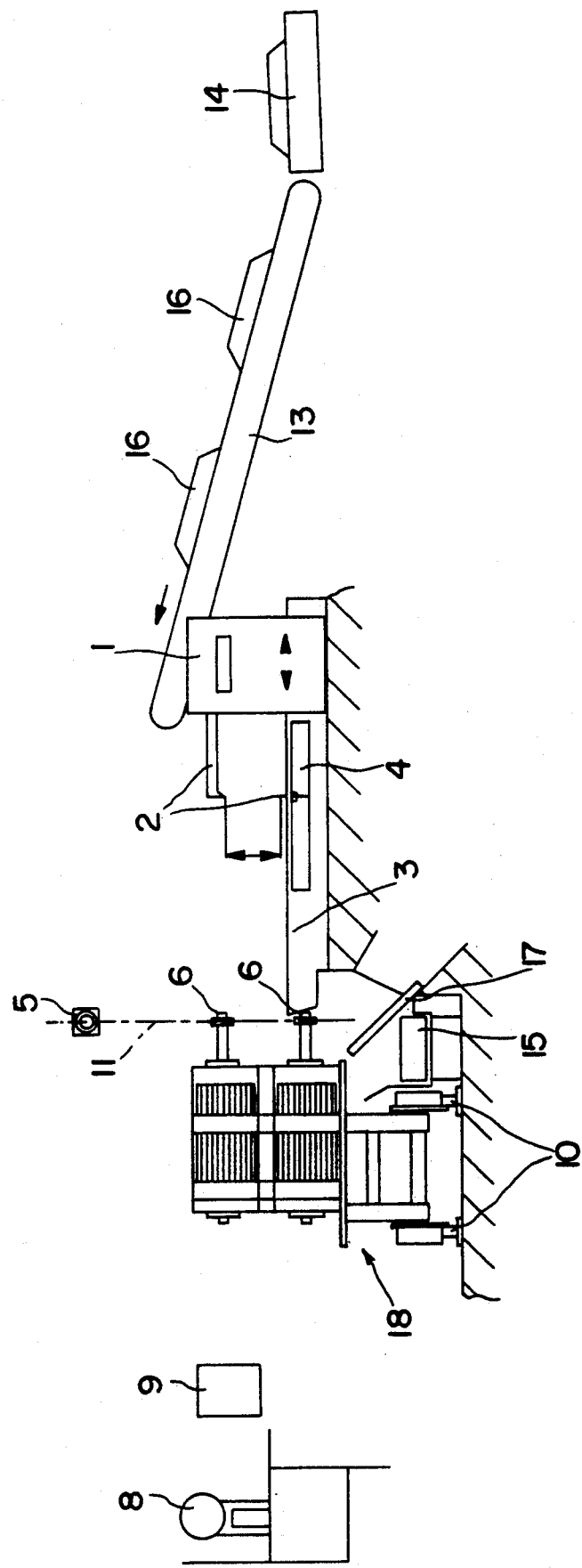
FIG. 1 shows an apparatus for finishing precut wood, in a lateral view.

The clamping trestles 1 are adjustable in the plane of the drawing of FIG. 1 and, respectively, in parallel thereto, along slide rails arranged at supports 3 for the wood to be machined.

Figure 2:
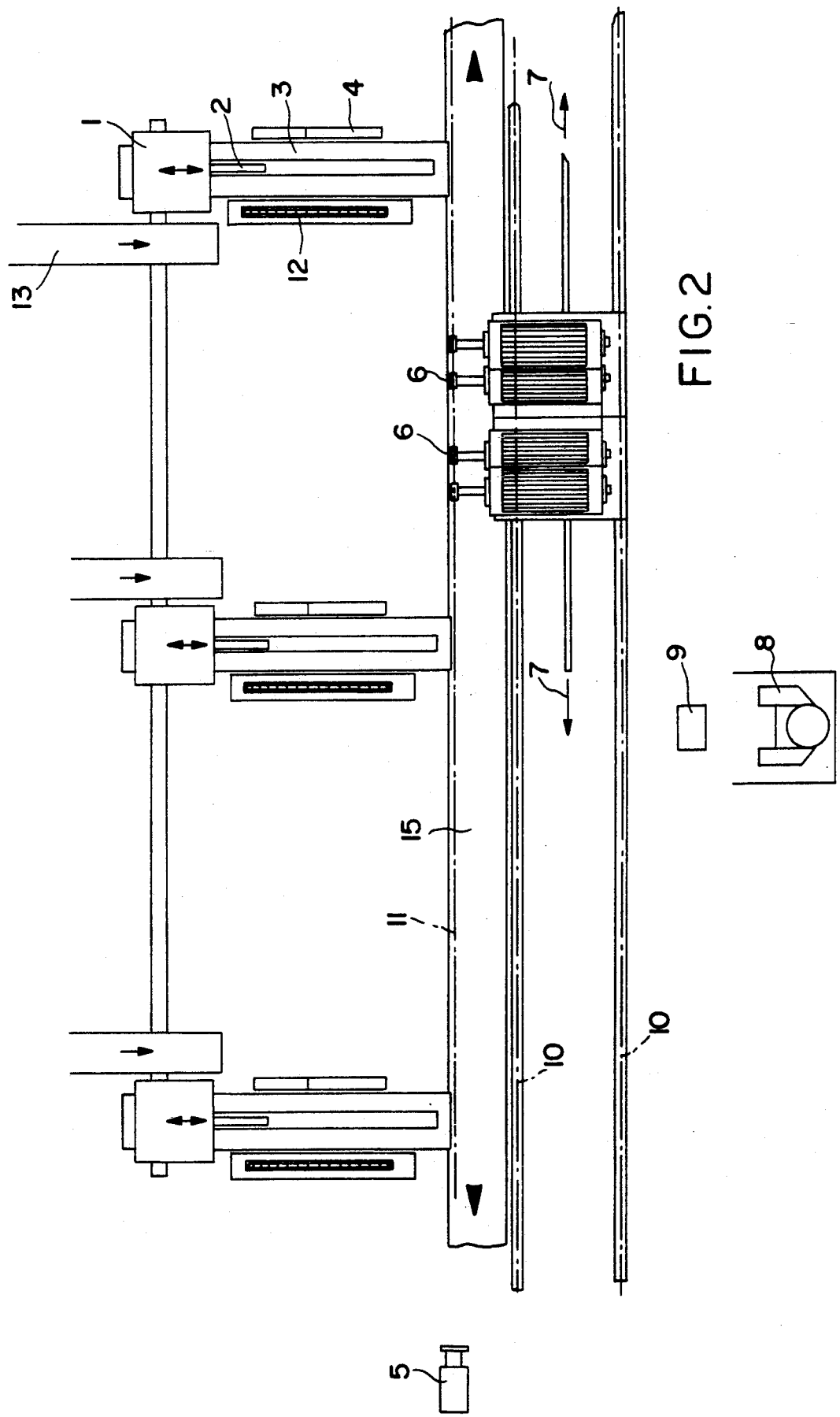
FIG. 2 is a top view of the apparatus of FIG. 1.
Figure 3:
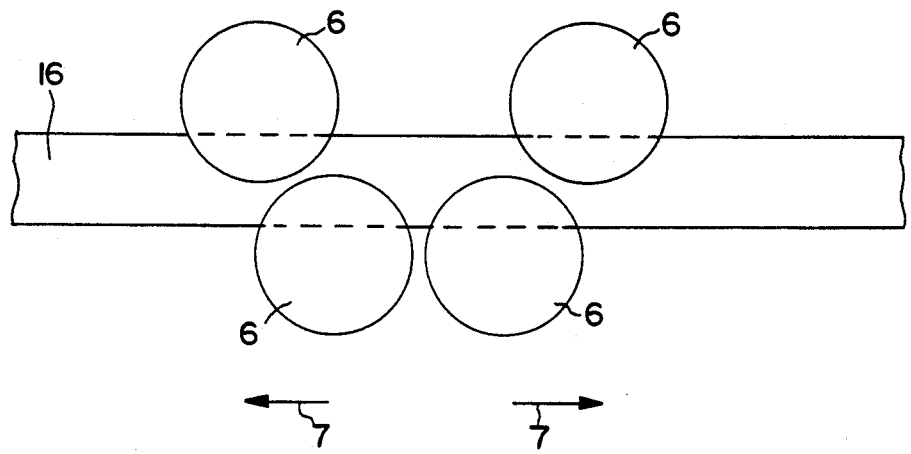
FIG. 3 shows schematically a saw utilized in the apparatus of this invention.

In the embodiment of the apparatus according to this invention illustrated in FIGS. 1 and 2, a circular saw 6 with four saw blades, the arrangement of which is shown in FIG. 3, is located in opposition to the clamping trestles 1. The circular saw 6 is movable in parallel to the cutting plane 11, i.e. perpendicularly to the drawing plane of FIG. 1, and is for this purpose mounted on a carriage 18 which runs on guide rails 10. The movement of the carriage 18 can be controlled by limit switches.

The saw blades of the circular saw 6 are designed for forward cut and rearward cut so that a cut can be executed with each stroke of the circular saw 6.

A conveyor belt 15 for left-hand drive and right-hand drive is arranged underneath the circular saw 6; by way of this belt, the wooden pieces obtained after the dividing work, such as slats, unplaned boards, squares, and the like, can be carried away. On account of the possibility of moving the conveyor belt 15 selectively in one or the other direction, presorting of the blanks produced in the apparatus of this invention can be executed.

A flap 17 is furthermore provided above the conveyor belt 15; this flap can be swung about a horizontal axis extending in parallel to the cutting plane 11. In the pivotal position illustrated in FIG. 1, the severed wooden pieces do not drop onto the conveyor belt 15 but rather are deflected laterally. Thus it is possible, for example, to separate offcuts from the main product. If this is unnecessary, then the flap 17 is flipped upwards into a vertical position. For this purpose, a drive mechanism, for example a pressure medium motor or the like, is provided which is not illustrated in detail. In case of an upwardly flipped flap 17, the wooden sections will drop onto the conveyor belt 15.

A conveyor belt, e.g. the conveyor belt 15, can likewise be included for carrying away any sawdust.

Several feeding conveyor belts 13 are arranged for feeding the wooden blanks 16 to be divided in the apparatus of this invention; these conveyor belts extend beyond the clamping trestles 1. The wooden blanks 16 can be fed to these conveyor belts by way of a longitudinal conveyor designed, for example, as a roller track 14.

As can be seen especially from FIG. 2, a lifting table 12 is provided beside each support 3 with slide rails for the clamping trestles 1; this lifting table can be raised from a rest position wherein it is lowered beneath the supports 3 up to the end of the feeding conveyors 13 on the delivery side. Each lifting table 12 is furthermore equipped with a conveyor chain by means of which the wooden blanks 16 taken over by the feeding conveyor 13 can be transported. With the lifting table 12 being extended, the clamping jaws 2 are automatically retracted.

After the wooden blanks 16 have been lowered by lowering the lifting tables 12 onto the supports 3, the clamping trestles 1 with the clamping jaws 2 being opened are advanced, and the wooden section 16 is clamped fixedly in place by operating the clamping jaws 2.

The alignment of the thus-retained wooden piece 16 with respect to the cutting plane 11 of the circular saw 6 is likewise accomplished by moving the clamping trestles 1; for this purpose, a sighting means can be included, consisting of a camera 5 and a monitor 9 which latter is arranged at the operating station of an operator. The sighting device can be a unit with display of the cutting line on the screen 9, as known from the periodical "HOLZ KURIER" [Wood Courier], 45th year, No. 24, pp. 12–14 (Jun. 14, 1990). This cutting line indicating device, called "Optiline", is distinguished in that a line corresponding to the cutting plane 11 is produced on the screen 9 in the image taken by the camera 5 so that the wooden blank 16 can be accurately aligned by the operator 8 by moving the clamping trestles 1 and/or the clamping jaws 2 with respect to the cutting line 11 and consequently an optimum utilization of the wood is made possible.

In the device according to this invention, means 4 for turning wooden blanks are provided beside each support 3 with the slide rails for the clamping trestles 1; these means comprise a movable arm. In case a wooden section 16 is to be turned, it is released by the clamping jaws 2 of the clamping trestles 1, and the turning means 4 (prismatic turner) is operated. Thereupon the clamping jaws 2 are again operated, and the turned wooden section is retained.

It is possible with the aid of the aforedescribed apparatus according to this invention to cut, for example, a main product from precanted round timber. In this connection, the quality can be perfectly evaluated, and the entering cut can be changed in minimum time.

The apparatus of this invention can also be utilized advantageously for the production of window frames (wood low in knots) since optimum evaluation of quality is made possible on account of the stationary workpiece (no lateral movements as in case of the known devices).

The positioning of the clamping trestles 1 for setting the cutting thickness can be effected mechanically but is preferably executed with electronic control. For example, the procedure of separating the wooden section (preferably the cants) takes place in a fully automatic fashion wherein, by following a program, the wood is positioned, then cut, then repositioned, then cut again, and so forth wherein, during the stroke of the circular saw 6 in each direction of the double arrow 7 of FIG. 2, a cut is performed.

Thanks to the prismatic turners 4, the wood 16 to be worked upon can be rapidly turned. In this way, it is possible to saw off a still usable wood (main product) even from already extensively trimmed wooden pieces which have been reduced to relative thinness. The procedure here can be such that, after cutting off the initial slab on one side of the cant, the latter is turned and is retained by the clamping jaws 2 facing the clamping trestles 1 with the just-cut side. Any waste is in this way kept to a very small quantity.

It is understood that it is also possible to employ single-shaft circular saw blades in place of the twin-shaft circular saw blades employed in the illustrated embodiment. In general, any desired saws can be utilized in the apparatus according to this invention.

Figure 4:
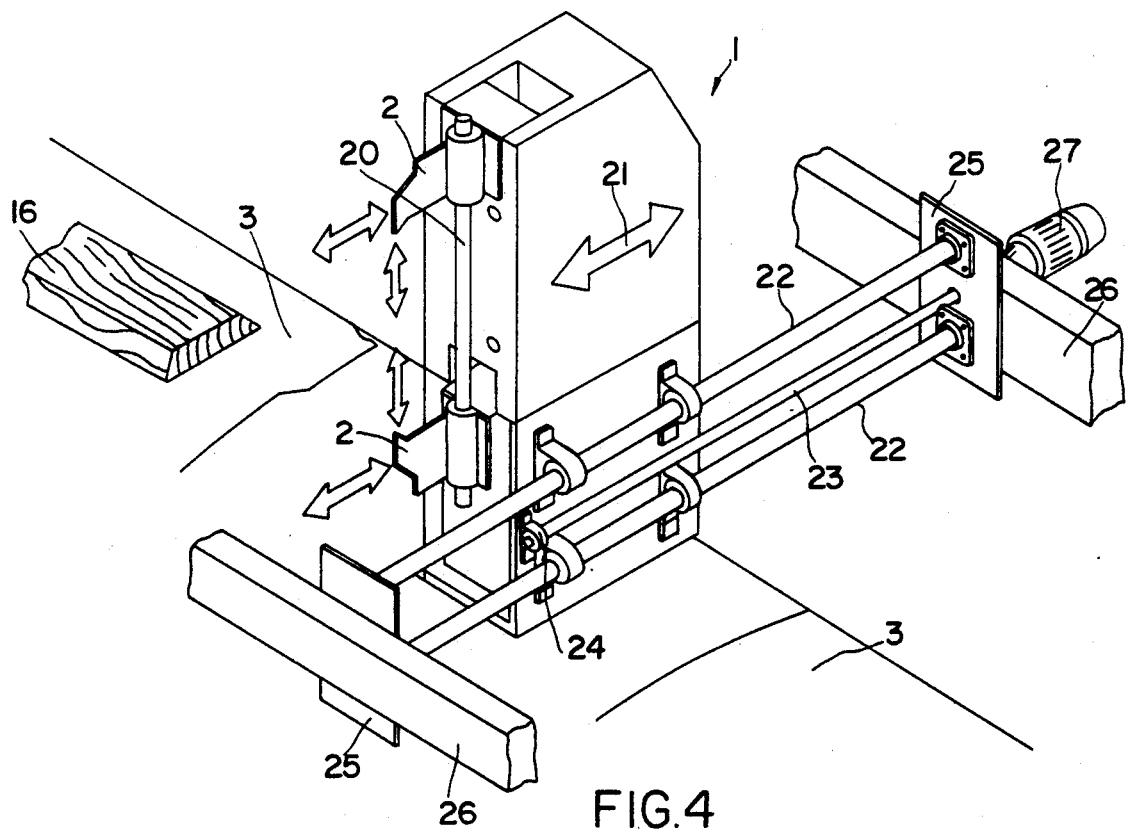
FIG. 4 shows another embodiment of the clamping trestles.

FIG. 4 shows an embodiment of a clamping trestle 1 wherein the clamping jaws 2 are displaceably guided in the clamping trestle 1 and are driven by a threaded spindle 20 in opposite directions.

The clamping trestle 1 can be moved in the direction of the double arrow 21 transversely to the direction of motion of the saw 6 and is displaceably supported on a pair of guide rods 22.

The clamping trestle 1 is driven by way of a threaded spindle 23 cooperating with a nut 24 attached to the clamping trestle 1. The guide rods 22 are attached by way of mounting plates 25 to carriers 26 on both sides.

The threaded spindle 23 is extended through a mounting plate 25 and a carrier 26 and coupled to a motor 27 (stepping motor) driving the threaded spindle 23.

The clamping trestles 1 can be adjusted by means of a hydraulic motor or an electrical geared motor in the embodiment shown in FIGS. 1 and 2, as well as in the example shown in FIG. 4. For this purpose, a joint shaft driven by the motor can be provided which (jointly)

adjusts, by way of endless chains, the clamping trestles transversely to the cutting plane 11.

The movements of the clamping trestles 1 and/or their clamping jaws can also be executed with the aid of pneumatic or hydraulic cylinders.

The provision can be made according to the invention that the clamping trestle 1 in its entirety is guided between supports 3 for the wood, or, in accordance with a further embodiment, the provision can be made that the clamping trestles 1 can be advanced only up to the supports 3 wherein merely the lower clamping jaw 2 can be lowered, in the advanced position of the clamping trestle 1, into a recess in the supports 3 for the wood. The supports 3 are indicated merely schematically in FIG. 4.

Figure 5:
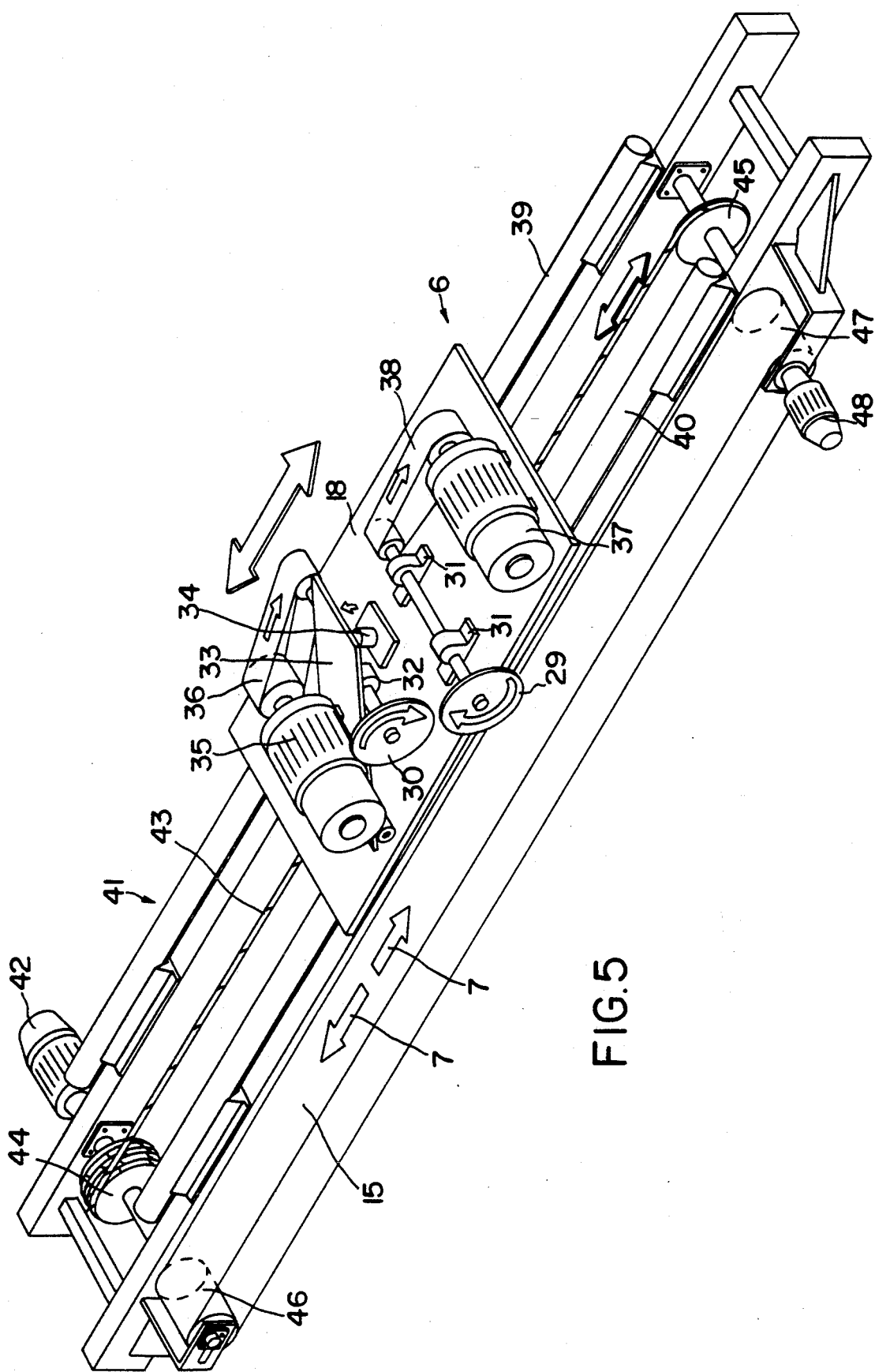
FIG. 5 shows a different embodiment of a saw.

FIG. 5 shows a twin-shaft design of a saw 6. Of the two saws 29 and 30 of the saw 6, one saw 29 is mounted via two bearing blocks 31 at the circular saw carriage 18. The second saw 30 is attached to the underside of a rocker 33 by way of two bearing blocks 32. The rocker 33 can be adjusted vertically by way of an adjusting unit, for example a pressure medium cylinder 34 engaging in the zone of the free end of the rocker 33.

At its end remote from the bearing blocks 32 for the saw 30, the rocker 33 is attached to the carriage 18 via a joint. Furthermore, a drive motor 35 for the saw 30 is arranged at the rocker 33, this motor being pivoted along with the rocker 33. The saw 30 is driven by the motor 35 by way of a belt 36. The belt 36 can, of course, also be replaced by equivalent means, such as, for example, chains or the like. Alternatively, the motor can drive the circular saw shaft directly or via a gear system.

For driving the saw 29, a motor 37 is provided which likewise drives the saw 29 by way of a belt 38 or the like. The motor 37 is fixedly mounted to the carriage 18.

On account of the pivotability of the saw 30 via the rocker 33, it is possible in a simple way to change the mutual distance of the two saws 29, 30 and thus to adapt the saw 6 to the respective requirements.

The carriage 18 is guided, in the embodiment shown in FIG. 5, on guide rods 39 and 40 which latter are attached to a frame 41. A motor 42 is provided for driving the carriage 18, this motor driving a rope pulley 43 connected to the circular saw carriage. The pulley is guided at the frame 41 via two guide rollers 44, 45.

Furthermore, a conveyor belt 15 is provided beside the frame 41 as well; this conveyor belt is extended over guide rollers 46 and 47 arranged coaxially to the guide rollers 44, 45 for the rope pulley 43 and is driven by a motor 48. The wood sections, such as slats, unplaned boards, and the like, obtained after the dividing work, can be transported away by means of the conveyor belt 15.

Feeding of wood to be worked on can also be effected from the left or from the right via conveyor rolls that can be lifted and lowered and are arranged between the supports 3.

It is also possible to design the inclined conveyors 13 to be pivotable and to make them of such a length that they extend between the clamping trestles 1 up to the supports 3. In this version, the lifting tables 12 can be omitted since the operation can be carried out so that the inclined conveyors 13 are lowered together with a piece of wood 16 lying at their free end zones, and thus the piece of wood 16 is thereby deposited on the supports.

In order to adjust the clamping trestles 1, it is also possible to provide rack-and-pinion drive mechanisms. These drive mechanisms can be joined or they can be independent of each other.

The support 3 for the wood 16 to be worked on can be very broad (up to 1000 mm) in the apparatus of this invention so that also misshapen wood 16, i.e. wood having very irregularly extending side edges, can be worked in an economical and optimum fashion (small amount of waste).

I claim:

1. Apparatus for dividing elongate wood comprising: a device for holding the wood, a saw unit displaceable in parallel to the longitudinal extension of the wood for executing the dividing work, and means for feeding the wood to be divided in a direction transverse to the direction of motion of the saw unit; said device for holding the wood being adjustable transverse to the direction of movement of the saw unit in order to set the cutting position, and including clamping trestles, each clamping trestle having upper and lower clamping jaws engaging the wood from above and from below, slideways from the clamping trestles and supports for the wood, said supports having cutouts for lowering the lower clamping jaws supported at the clamping trestles through said cutouts below the supports; said saw unit being guided on a stationary guide means and being effective toward two sides; said means for feeding the wood comprising a longitudinal conveyor and at least two transverse conveyors extending from the longitudinal conveyor obliquely over the clamping trestles, and lifting tables arranged beside each support, said tables being raisable from a ready position wherein they are lowered beneath the supports into a transfer position, wherein they are arranged beside the ends of the transverse conveyors on a delivery side.

2. Apparatus according to claim 1, further comprising a working station for an operator and a screen for displaying a cutting plane, said station being provided beside the path of motion for the saw unit on the side of the saw unit lying in opposition to the device for holding the wood.

3. Apparatus according to claim 2, wherein the slideways for the clamping trestles are constituted by guide rods.

4. Apparatus according to claim 1, further comprising drive means for shifting the clamping trestles, said drive means being constituted by a threaded spindle driven by a motor.

5. Apparatus according to claim 1, wherein the clamping jaws are pivotably supported at the clamping trestles.

6. Apparatus according to claim 1, wherein the clamping jaws are displaceably guided at the clamping trestles, and are driven via a threaded spindle.

7. Apparatus according to claim 1, wherein the saw unit has at least one circular saw for forward and rearward cut.

8. Apparatus according to claim 7, wherein the saw unit is designed as a multi-shaft unit.

9. Apparatus according to claim 8, wherein the saw unit is a four-shaft unit having four saw blades located in one plane, one pair of saws exhibiting a larger mutual distance than the second pair of saws, whereby the saw blades of the pair of saws in closer proximity to each other engage in between the saw blades of the widely spaced pair of circular saws.

10. Apparatus according to claim 8, wherein the saw unit is of a twin-shaft design, with one saw being mounted on an adjustably supported rocker, and the second saw being fixedly mounted to a circular saw carriage.

11. Apparatus according to claim 10, wherein the saws are driven by motors via a belt drive mechanism.

12. Apparatus according to claim 1, wherein a conveyor belt is provided underneath the saw for carrying away pieces cut off from the wood.

13. Apparatus according to claim 12, wherein a flap is provided which can be swung inwards and outwards over the conveyor belt about an axis oriented in parallel to the conveying direction of the conveyor belt.

14. Apparatus according to claim 1, wherein each lifting table is provided with a conveying member for transporting the wood.

* * * * *